United States Patent
Kim et al.

(10) Patent No.: US 12,073,998 B2
(45) Date of Patent: Aug. 27, 2024

(54) MULTILAYER ELECTRONIC COMPONENT

(71) Applicant: SAMSUNG ELECTRO-MECHANICS CO., LTD., Suwon-si (KR)

(72) Inventors: Min Seop Kim, Suwon-si (KR); Kyoung Jin Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 217 days.

(21) Appl. No.: 17/733,041

(22) Filed: Apr. 29, 2022

(65) Prior Publication Data

US 2023/0197349 A1  Jun. 22, 2023

(30) Foreign Application Priority Data

Dec. 20, 2021 (KR) .................. 10-2021-0182614

(51) Int. Cl.
  *H01G 4/00* (2006.01)
  *H01G 4/012* (2006.01)
  *H01G 4/30* (2006.01)
  *H01G 4/12* (2006.01)
  *H01G 4/232* (2006.01)

(52) U.S. Cl.
  CPC .............. *H01G 4/30* (2013.01); *H01G 4/012* (2013.01); *H01G 4/1227* (2013.01); *H01G 4/232* (2013.01)

(58) Field of Classification Search
  CPC ........ H01G 4/30; H01G 4/012; H01G 4/1227; H01G 4/232
  See application file for complete search history.

(56) References Cited

U.S. PATENT DOCUMENTS

| | | | |
|---|---|---|---|
| 2013/0094121 A1 | 4/2013 | Endo et al. | |
| 2013/0135788 A1* | 5/2013 | Park | H01G 4/232 427/79 |
| 2013/0148261 A1* | 6/2013 | Kim | H01B 1/22 252/514 |
| 2014/0268485 A1* | 9/2014 | Kang | H01B 1/22 252/512 |
| 2015/0348712 A1* | 12/2015 | Lee | H01G 4/30 156/89.12 |
| 2018/0182551 A1 | 6/2018 | Ahn et al. | |
| 2021/0193389 A1 | 6/2021 | Kim et al. | |

FOREIGN PATENT DOCUMENTS

| | | |
|---|---|---|
| JP | 5838927 B2 | 1/2016 |
| KR | 10-2018-0073083 A | 7/2018 |
| KR | 10-2021-0081668 A | 7/2021 |

* cited by examiner

*Primary Examiner* — Pete T Lee
(74) *Attorney, Agent, or Firm* — Morgan, Lewis & Bockius LLP (57) ABSTRACT

A multilayer electronic component includes: a body including dielectric layers and a plurality of internal electrodes stacked on each other in a first direction, while having the dielectric layer interposed therebetween; margin portions disposed on opposite surfaces of the body in a second direction perpendicular to the first direction; and external electrodes disposed on opposite surfaces of the body in a third direction perpendicular to the first and second directions, and respectively connected to the internal electrodes, wherein the margin portion includes a protection region, in which a plurality of metal particles are disposed, in at least one of upper and lower portions thereof in the first direction.

20 Claims, 6 Drawing Sheets

MULTILAYER ELECTRONIC COMPONENT

CROSS-REFERENCE TO RELATED APPLICATION(S)

This application claims benefit of priority to Korean Patent Application No. 10-2021-0182614 filed on Dec. 20, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on a printed circuit board of any of various electronic products, such as an image display device including a liquid crystal display (LCD) or a plasma display panel (PDP), a computer, a smartphone or a cellular phone, to serve to charge or discharge electricity therein or therefrom.

The multilayer ceramic capacitor may include a body formed by stacking a plurality of dielectric layers, on each of which an internal electrode is printed, and external electrodes disposed on both ends of the body. In addition, the capacitor may include a margin portion, on which the internal electrode is not printed, on a side of the dielectric layer.

The multilayer ceramic capacitor has a small size, implements high capacitance, may be easily mounted on a circuit board, and may thus be used as a component of various electronic devices. There has been increasing demand for the multilayer ceramic capacitor to have a smaller size and higher capacitance as each of various electronic devices such as a computer and a mobile device has a smaller size and higher output.

In addition, in recent years, the multilayer ceramic capacitor has also been required to have high reliability and high strength characteristics to be used for a vehicle or an infotainment system as its related field has increasing interest in an electronic component for a vehicle.

A factor which may cause a problem in the high reliability of the multilayer ceramic capacitor may be plating solution infiltration occurring during a plating process, occurrence of a crack caused by an external impact, external moisture infiltration or the like.

In particular, the internal electrode disposed outermost among the plurality of internal electrodes may have a short path of external moisture infiltration, and external moisture may easily infiltrate into the internal electrode through the margin portion. Such external moisture infiltration may cause the multilayer ceramic capacitor to have lower quality.

In order to solve this problem, the following prior art document suggests that the dielectric layer and the margin portion are adjusted to have compositions different from each other. However, it may be required that separate ceramic slurry is injected into the composition or a separate dielectric sheet is attached to the internal electrode, and the capacitor may thus have lower process efficiency.

SUMMARY

An aspect of the present disclosure may provide a multilayer electronic component including an outermost internal electrode prevented from external moisture infiltration through a margin portion.

Another aspect of the present disclosure may provide a multilayer electronic component having improved mechanical strength.

However, the present disclosure is not limited to the description above, and may be more readily understood in the description of exemplary embodiments of the present disclosure.

According to an aspect of the present disclosure, a multilayer electronic component may include: a body including dielectric layers and a plurality of internal electrodes stacked on each other in a first direction, while having the dielectric layer interposed therebetween; margin portions disposed on opposite surfaces of the body in a second direction perpendicular to the first direction; and external electrodes disposed on opposite surfaces of the body in a third direction perpendicular to the first and second directions, and respectively connected to the internal electrodes, wherein at least one of the margin portions includes a protection region, in which a plurality of metal particles are disposed, in at least one of upper and lower portions thereof in the first direction.

According to another aspect of the present disclosure, a multilayer electronic component may include: a body including a plurality of internal electrodes stacked on each other in a first direction and a dielectric layer interposed therebetween; margin portions disposed on opposite surfaces of the body in a second direction perpendicular to the first direction, wherein at least one of the margin portions includes a protection region including metal particles in at least one of upper and lower portions of the at least one of the margin portions in the first direction, and the metal particles include metal particles having a flake shape; and external electrodes disposed on opposite surfaces of the body in a third direction perpendicular to the first and second directions, and respectively connected to the internal electrodes.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, a first direction may indicate a stacking direction (or thickness T direction), a second direction may indicate a width W direction, and a third direction may indicate a length L direction.

Figure 1:
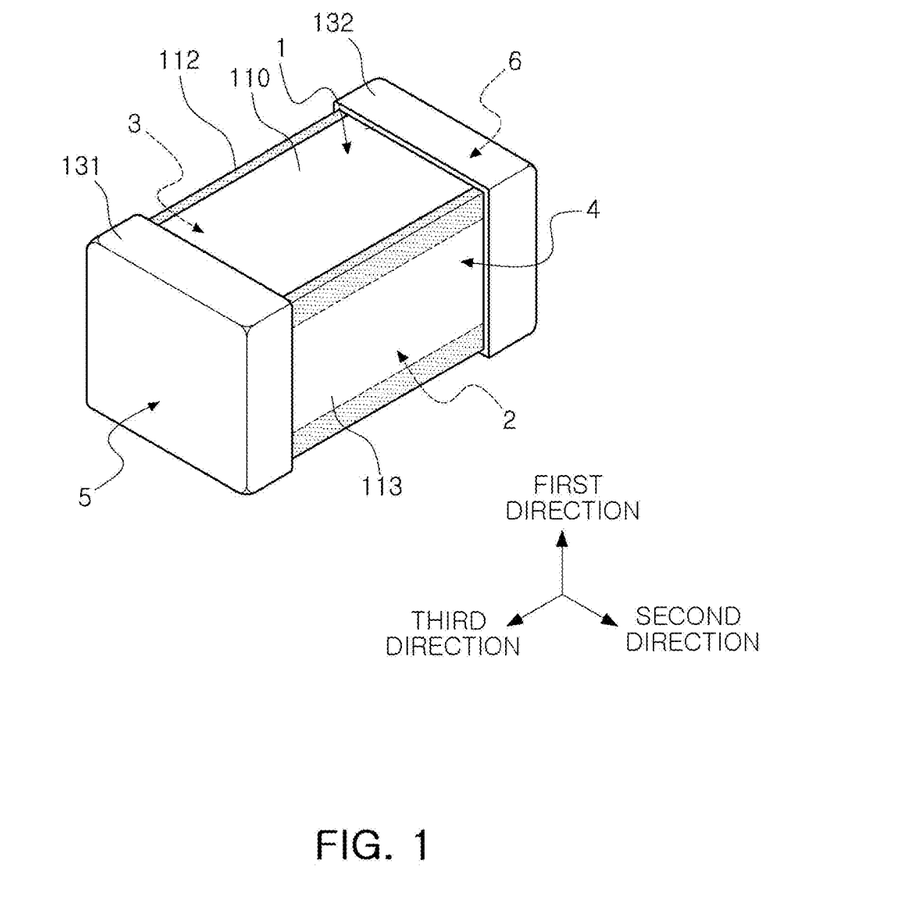
FIG. 1 is a perspective view schematically illustrating a multilayer electronic component according to an exemplary embodiment of the present disclosure.
Figure 2:
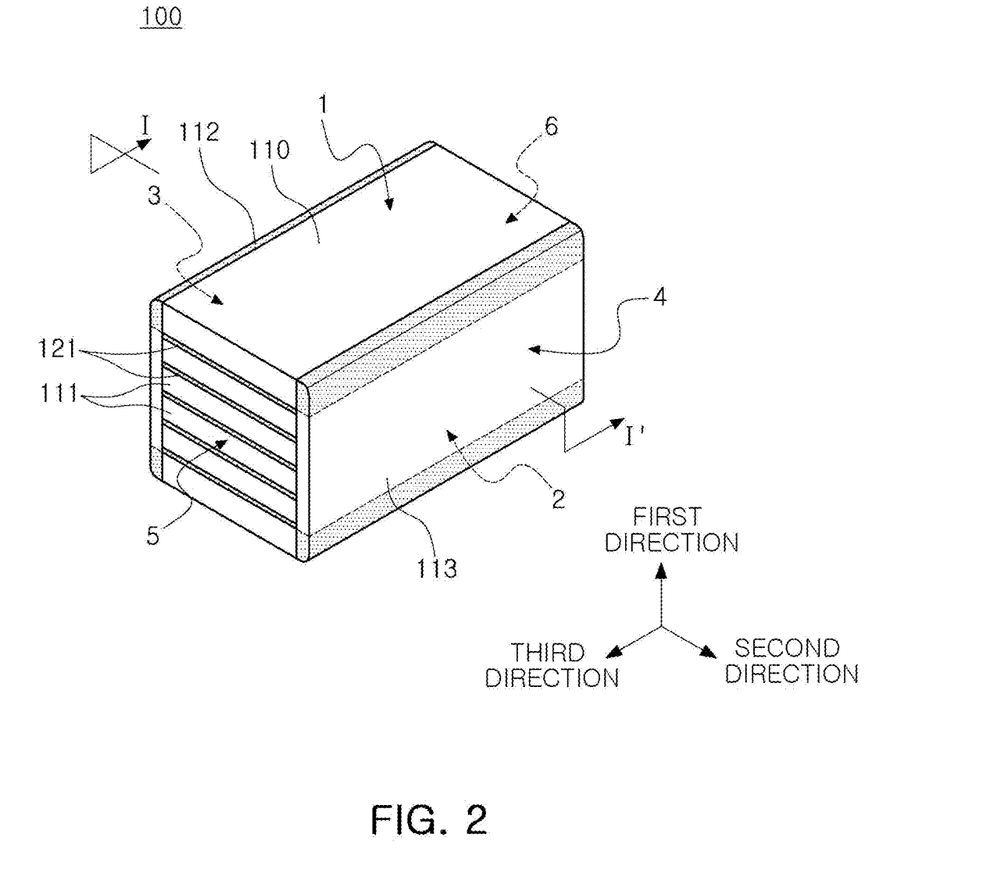
FIG. 2 is a perspective view illustrating an appearance of a body on which a margin portion of FIG. 1 is disposed.
Figure 3:
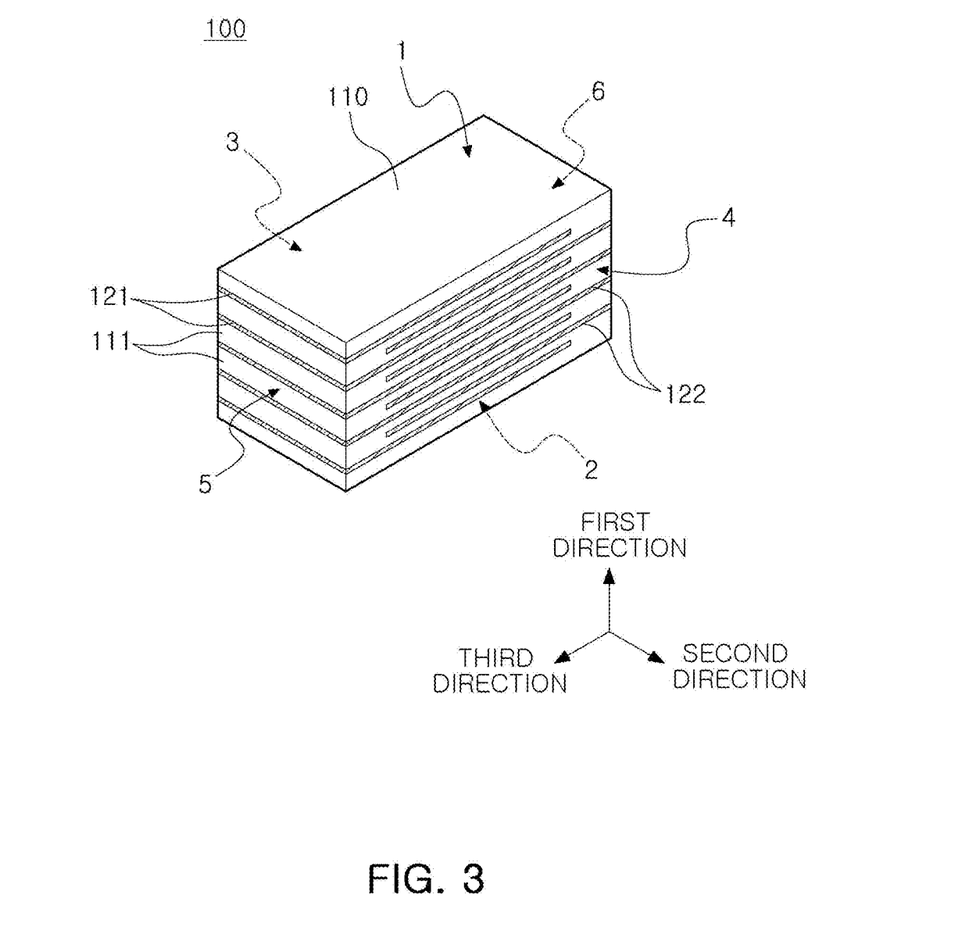
FIG. 3 is a perspective view illustrating an appearance of a body of FIG. 2.
Figure 4:
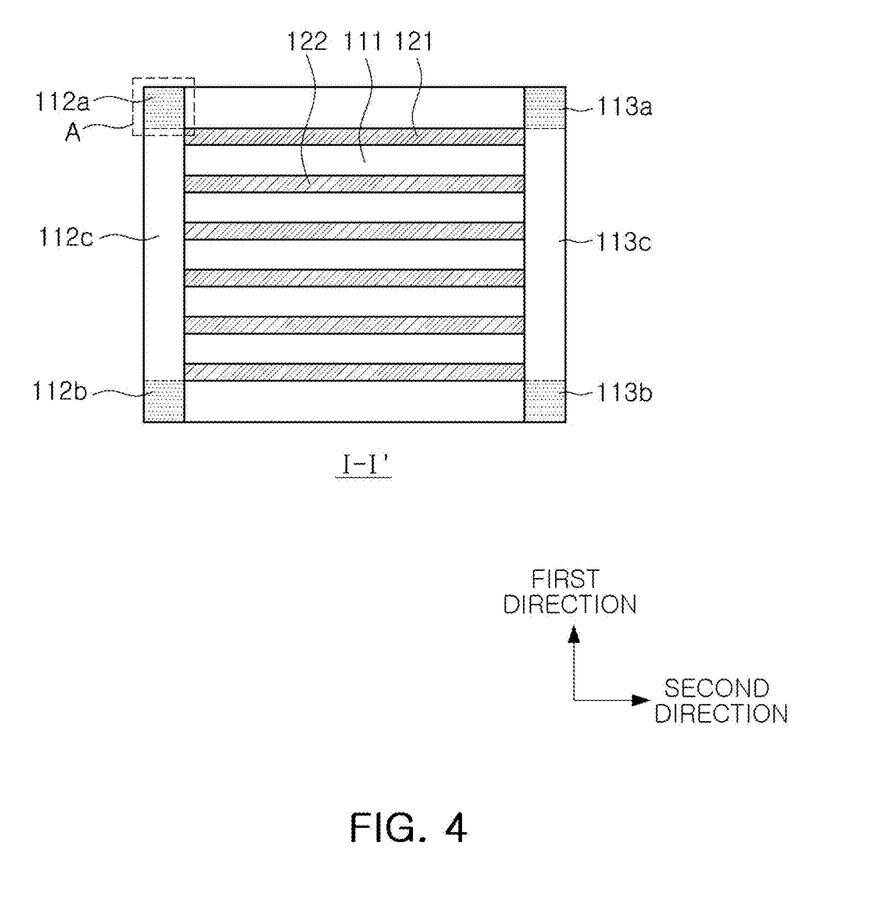
FIG. 4 is a schematic cross-sectional view taken along line I-I' of FIG. 2.
Figure 5:
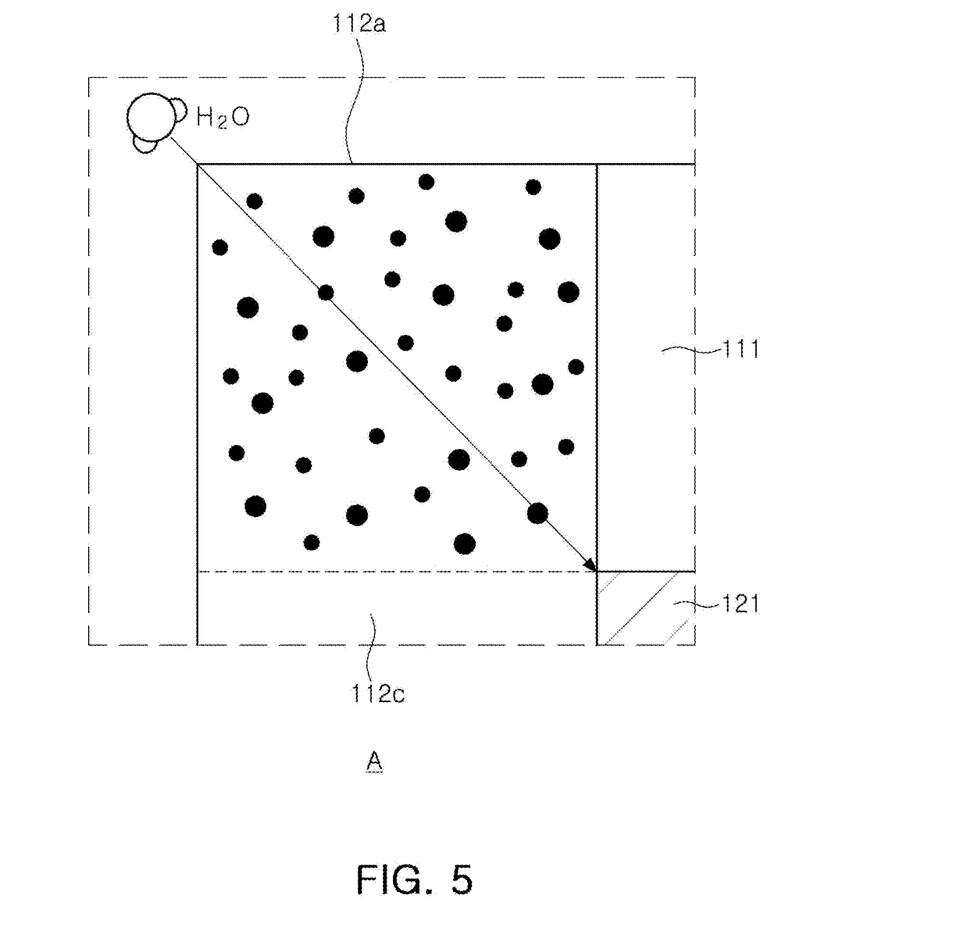
FIG. 5 schematically illustrates an enlarged view of region A of FIG. 4 and a path of external moisture infiltration.
Figure 6:
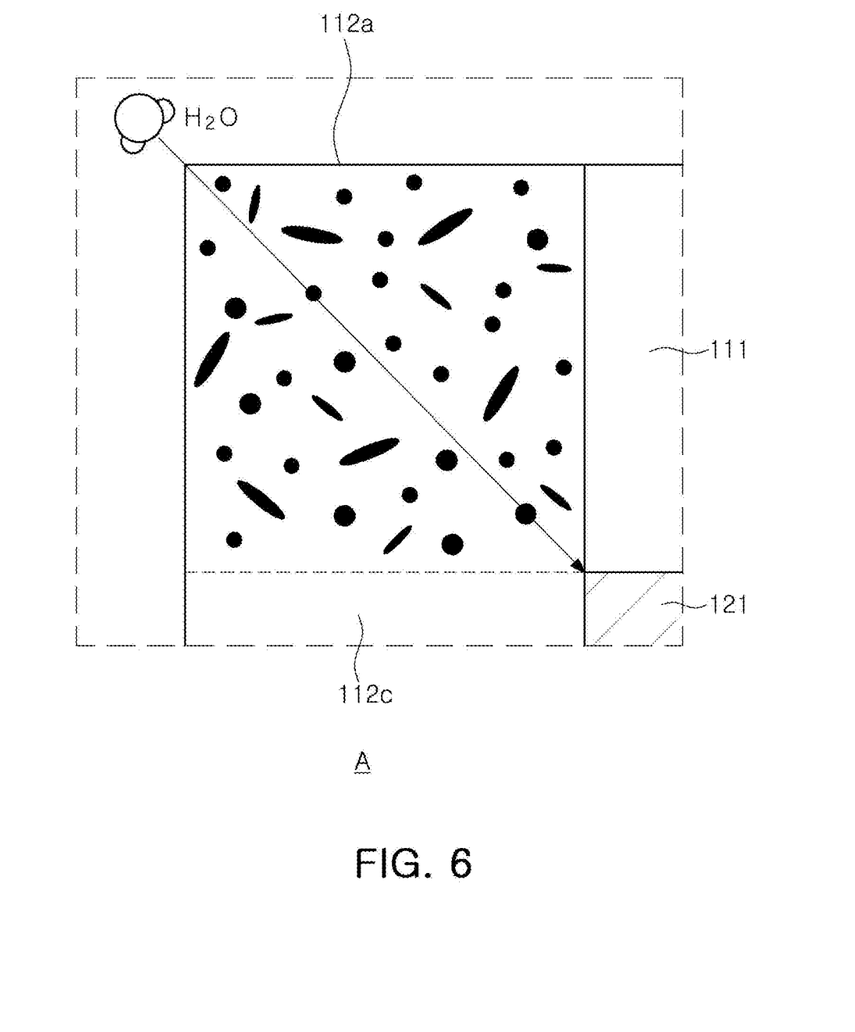
FIG. 6 schematically illustrates an enlarged view of region A according to an exemplary embodiment of the present disclosure.

FIG. 1 is a perspective view schematically illustrating a multilayer electronic component according to an exemplary embodiment of the present disclosure;

FIG. 2 is a perspective view illustrating an appearance of a body on which a margin portion of FIG. 1 is disposed;

FIG. 3 is a perspective view illustrating an appearance of a body of FIG. 2;

FIG. 4 is a schematic cross-sectional view taken along line I-I' of FIG. 2;

FIG. 5 schematically illustrates an enlarged view of a region A of FIG. 4 and a path of external moisture infiltration; and FIG. 6 schematically illustrates an enlarged view of the region A according to an exemplary embodiment of the present disclosure.

Hereinafter, the multilayer electronic component according to an exemplary embodiment of the present disclosure is described with reference to FIGS. 1 through 6.

A multilayer electronic component 100 according to an exemplary embodiment of the present disclosure may include: a body 110 including dielectric layers 111 and a plurality of internal electrodes 121 and 122 stacked on each other in the first direction, while having the dielectric layer 111 interposed therebetween; margin portions 112 and 113 disposed on opposite surfaces of the body in the second direction perpendicular to the first direction; and external electrodes 131 and 132 disposed on opposite of the body in the third direction perpendicular to the first and second directions, and respectively connected to the internal electrodes.

The body 110 may include the dielectric layer 111 and the first or second internal electrode 121 or 122, which are alternately stacked on each other.

The body 110 is not limited to a particular shape, and may have a hexahedral shape or a shape similar to the hexahedral shape, as shown in the drawings. The body 110 may not have a shape of the hexahedron having perfectly straight lines because a ceramic powder included in the body 110 is contracted or its edge is polished in a process in which the body is sintered. However, the body 110 may substantially have the hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The plurality of dielectric layers 111 included in the body 110 may already be sintered, and adjacent dielectric layers 111 may thus be integrated with each other, thus making it difficult to confirm a boundary therebetween without using the scanning electron microscope (SEM).

A material of the dielectric layer 111 is not particularly limited as long as the capacitor obtains sufficient capacitance. For example, the dielectric layer may use a material such as a barium titanate-based material, a lead composite perovskite-based material or a strontium titanate-based material. The barium titanate-based material may include a barium titanate ($BaTiO_3$) based ceramic powder, and this ceramic powder may be, for example, $BaTiO_3$ or $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$ or the like, in which calcium (Ca), zirconium (Zr) or the like is partially dissolved in $BaTiO_3$.

The material of the dielectric layer 111 may be prepared by adding various ceramic additives, organic solvents, binders, dispersants and the like, to a powder such as the barium titanate ($BaTiO_3$) powder or the like, according to an object of the present disclosure.

Here, the dielectric layer 111 may have a thickness arbitrarily changed based on a capacitance design of the multilayer electronic component 100, and one dielectric layer may have a thickness of 0.1 to 10 μm after being sintered in consideration of the size and capacitance of the body 110. However, the present disclosure is not limited thereto.

The internal electrode 121 or 122 may be alternately disposed with the dielectric layer 111, and the plurality of first internal electrodes 121 and the plurality of second internal electrodes 122 may be disposed to oppose each other interposing the dielectric layer 111 therebetween.

That is, the first and second internal electrodes 121 and 122, a pair of electrodes having polarities different from each other, may be formed by printing, on the dielectric layer 111, a conductive paste for an internal electrode, which includes a conductive metal, to a predetermined thickness to be alternately exposed through the fifth and sixth surfaces 5 and 6 of the body 110 in a stack direction of the dielectric layers 111, while having the dielectric layer 111 interposed therebetween, and may be electrically insulated from each other by the dielectric layer 111 interposed therebetween.

A thickness of the first or second internal electrode 121 or 122 may be determined depending on a usage of the multilayer capacitor, and may be determined, for example, to be in a range of 0.2 to 1.0 μm in consideration of the size and capacitance of the body 110. However, the present disclosure is not limited thereto.

The conductive metal included in the internal electrode 121 or 122 may be at least one of nickel (Ni), copper (Cu), palladium (Pd), silver (Ag), gold (Au), platinum (Pt), tin (Sn), tungsten (W), titanium (Ti) or alloys thereof, and the present disclosure is not limited thereto.

The stack number of internal electrodes may be 400 layers or more to implement the multilayer electronic component having higher capacitance, and the present disclosure is not limited thereto.

The external electrodes 131 and 132 may be formed outside the body 110 and respectively connected to the internal electrode 121 or 122, and specifically include the first and second external electrodes 131 and 132 respectively disposed on the fifth and sixth surfaces 5 and 6 of the body 110, opposite to each other. Accordingly, the first external electrode 131 may be connected to the plurality of first internal electrodes 121 exposed through the fifth surface, and the second external electrode 132 may be connected to the plurality of second internal electrodes 132 exposed through the sixth surface.

Here, the external electrode 131 or 132 may be a fired electrode including the conductive metal and glass, and the conductive metal may use, for example, one of silver (Ag), lead (Pb), platinum (Pt), nickel (Ni), and copper (Cu) or alloys thereof. However, the present disclosure is not limited thereto.

The external electrode 131 or 132 may be formed of a plurality of layers, and in particular, a plating layer may be disposed on the external electrode. The plating layer may serve to improve mountability of the multilayer electronic component 100.

The plating layer may include at least one of nickel (Ni), tin (Sn), copper (Cu), palladium (Pd) or alloys thereof, and may be the plurality of layers. In particular, the plating layer may be formed by sequentially stacking a nickel (Ni) plating layer and a tin (Sn) plating layer on the external electrode 131 or 132.

The body 110 may be a portion contributing to capacitance formation of the multilayer electronic component 100, and may include a capacitance formation portion formed by repeatedly stacking the plurality of internal electrodes 121 and 122 interposing the dielectric layer 111 therebetween and upper and lower cover portions respectively stacked on upper and lower surfaces of the capacitance formation portion in the first or thickness direction.

The multilayer electronic component 100 according to an exemplary embodiment of the present disclosure may include the first and second margin portions 112 and 113 respectively disposed on the third and fourth surfaces 3 and 4, which are both surfaces of the body 110 opposing each other in the second direction perpendicular to the first direction.

The first or second margin portion 112 or 113 may indicate a region between either end of the internal electrode 121 or 122 and a boundary surface of the body 110, based on a cross section of the body 110 cut in a first-second direction.

The first or second margin portion 112 or 113 may basically serve to prevent damage to the internal electrode, caused by physical or chemical stress.

Referring to FIG. 4, the margin portion 112 or 113 may include the first margin portion 112 or the second margin portion 113 disposed on the third or fourth surface 3 or 4 of the body 110, and the margin portion may include a protection region 112a or 112b, or 113a or 113b, in which a plurality of metal particles are disposed, in at least one of upper and lower portions thereof in the first direction. The upper and lower portions may be defined as toward the top of FIG. 1 along the first direction and toward the bottom of FIG. 1 along the first direction. In some embodiments, the internal electrodes do not overlap the protection region in a first direction.

In detail, the first margin portion 112 may include the first protection region 112a or 112b, in which the plurality of metal particles are disposed, in at least one of upper and lower portions thereof in the first direction, and the first protection region may include a first-A protection region 112a disposed in the upper portion of the first margin portion in the first direction and a first-B protection region 112b disposed in the lower portion of the first margin portion in the first direction.

In addition, the second margin portion 113 may include the second protection region 113a or 113b, in which the plurality of metal particles are disposed, in at least one of upper and lower portions thereof in the first direction, and the second protection region may include a second-A protection region 113a disposed in the upper portion of the second margin portion in the first direction and a second-B protection region 113b disposed in the lower portion of the second margin portion in the first direction.

The protection region may include the plurality of metal particles, and the metal particle may thus first adsorb moisture and consume the adsorbed moisture by a chemical reaction even though the moisture infiltrates into the multilayer electronic component 100, thereby preventing the moisture from deeply infiltrating into the multilayer electronic component 100.

Referring to FIG. 5, the plurality of metal particles may be disposed in a shortest path through which the external moisture infiltrates into the internal electrode, thereby suppressing the external moisture infiltration through the shortest path. Accordingly, the multilayer electronic component 100 may thus have more improved moisture resistance reliability.

The metal particle included in the protection region may be oxidized by the chemical reaction with the moisture as shown in Formula 1 below, and the moisture infiltrating from the outside may thus be removed by reduction. That is, the metal particle may react with the moisture and then be oxidized, thereby forming metal oxide and removing the moisture.

$$M+H_2O \rightarrow MO+H_2 \text{(M indicates metal)} \quad \text{[Chemical Formula 1]}$$

In addition, the protection region may include the plurality of metal particles, and a ratio of the metal disposed in the body 110 may thus be increased, thereby improving a mechanical strength of the multilayer electronic component 100. It may thus be possible to reduce frequency of a crack occurring due to external impact or the like.

The first protection region 112a or 112b and the second protection region 113a or 113b may respectively include the same dielectric as a central region 112c or 113c except that the plurality of metal particles are disposed therein.

FIG. 5 shows that the metal particles only have a spherical shape. However, the present disclosure is not limited thereto, and the metal particles may be a type in which the spherical shape and a flake shape are mixed with each other as shown in FIG. 6.

Here, the protection regions 112a or 112b and 113a or 113b may respectively be formed at a level between an upper surface of the margin portion 112 or 113 and the internal electrode disposed at an uppermost of the internal electrodes 121 or 122, and a level between a lower surface of the margin portion 112 or 113 and the internal electrode disposed at a lowermost of the internal electrode 121 or 122.

Referring to FIG. 4, the first-A protection region 112a or the second-A protection region 113a may be formed at the level between the upper surface of the margin portion 112 or 113 and the internal electrode disposed at the uppermost of the internal electrode 121 or 122.

In addition, the first-B protection region 112b or the second-B protection region 113b may be formed at the level between the lower surface of the margin portion 112 or 113 and the internal electrode disposed at the lowermost of the internal electrode 121 or 122.

The upper and lower surfaces of the margin portion 112 or 113 may indicate both surfaces of the margin portion 112 or 113 opposing each other in the first direction. The upper surface of the margin portion may be formed at a level substantially the same as a level of the first surface of the body, and the lower surface of the margin portion may be formed at a level substantially the same as a level of the second surface of the body.

Here, 2 to 30 µm may be a range of a length of the protection region 112a, 112b, 113a or 113b in the first direction. When less than 2 µm is a range of the length of the protection region in the first direction, the multilayer electronic component 100 may have reduced mechanical strength against external impacts and lower ability to remove the external moisture. When more than 30 µm is a range of the length of the protection region in the first direction, an area in which the protection region and the internal electrode 121 or 122 overlap each other may be reduced, and it may thus be difficult for the multilayer electronic component 100 to secure higher capacitance. The length of the protection region may be measured by using an optical microscope (OM), a scanning electron microscope (SEM), a transmission electron microscope (TEM) or the like. Other methods and/or tools appreciated by one of ordinary skill in the art, even if not described in the present disclosure, may also be used.

In an exemplary embodiment of the present disclosure, the protection region may be entirely formed on the margin portion 112 or 113 in the second direction. In addition, the protection region may be entirely formed on the margin portion 112 or 113 in the third direction.

Accordingly, a sufficient amount of metal particles may be disposed in the protection region included in the margin portion 112 or 113, and the external moisture may thus be effectively removed by the metal particles included in the protection region. It is thus possible to further improve the moisture resistance reliability of the multilayer electronic component 100.

Here, 2 to 30 μm may be a range of a length of the protection region in the second direction. When less than 2 μm is a range of the length of the protection region in the second direction, the multilayer electronic component 100 may have a reduced mechanical strength against the external impact and a lower ability to remove the external moisture. When more than 30 μm is a range of the length of the protection region in the second direction, an area in which the protection region and the internal electrode 121 or 122 overlap each other may be reduced, and it may thus be difficult for the multilayer electronic component 100 to secure the higher capacitance.

In an exemplary embodiment of the present disclosure, the metal particle may include a metal having a higher ionization tendency than hydrogen. In general, the metal may have a stronger oxidization tendency when having the higher ionization tendency. That is, the metal having the higher ionization tendency than hydrogen may easily react with hydrogen and then be oxidized to effectively form the metal oxide and remove the moisture. A metal having a lower ionization tendency than hydrogen may have a weaker oxidization tendency, which may be disadvantageous to remove the moisture.

In particular, the metal particle may include at least one of nickel (Ni), cobalt (Co), tin (Sn), zinc (Zn), magnesium (Mg), manganese (Mn) or alloys thereof. Nickel (Ni), cobalt (Co), tin (Sn), zinc (Zn), magnesium (Mg) or manganese (Mn) may be the metal having the higher ionization tendency than hydrogen, and may thus have the stronger oxidization tendency, thus easily removing the moisture infiltrating from the outside.

0.05 to 2 μm may be a range of a diameter of the metal particle. When the diameter of the metal particle satisfies the above range, the multilayer electronic component 100 may have more improved ability to remove the moisture infiltrating from the outside, and thus have the improved moisture resistance reliability.

When less than 0.05 μm is a range of the diameter of the metal particle, the multilayer electronic component 100 may have reduced moisture adsorption ability. When more than 2 μm is a range of the diameter of the metal particle, the metal particles may not be uniformly disposed in the first protection region 112a or 112b, or the second protection region 113a or 113b, and the multilayer electronic component 100 may thus have a reduced ability to remove the moisture infiltrating from the outside.

In an exemplary embodiment of the present disclosure, 30 or more metal particles may be disposed in a cross section of the multilayer electronic component in a direction perpendicular to the third direction. That is, as shown in FIG. 4, 30 or more may be a range of a sum of the number of the metal particles included in the cross section of each of the protection regions 112a, 112b, 113a and 113b. When 30 or more is the range of the number of the metal particles disposed in the above cross section, the multilayer electronic component 100 may have the more improved ability to remove the external moisture, and thus have the improved moisture resistance reliability.

The number of the metal particles included in the above cross section may be measured on the fifth and sixth surfaces 5 and 6 of the body, exposed by removing a portion of each of the external electrodes 131 and 132. Alternatively, the number of the metal particles may be measured on the cross sections of the respective protection regions 112a, 112b, 113a and 113b, exposed by cutting the multilayer electronic component 100 in the direction perpendicular to the third direction.

The number of the metal particles may be obtained by measuring the above cross section by using an optical microscope (OM), a scanning electron microscope (SEM), a transmission electron microscope (TEM), a Raman analysis, a scanning electron microscopy-energy dispersive spectroscopy (SEM-EDS), a transmission electron microscopy-energy dispersive spectroscopy (TEM-EDS) or the like. However, the present disclosure is not limited thereto.

In an exemplary embodiment of the present disclosure, 45% or less may be a range of a ratio of the number of the metal particles each having a diameter of 1 μm or more among the metal particles disposed in the cross section of the multilayer electronic component in the direction perpendicular to the third direction.

When more than 45% is a range of the ratio of the number of the metal particles each having the diameter of 1 μm or more among the metal particles disposed in the protection region, the metal particles may not be uniformly disposed in the protection region, and the multilayer electronic component may thus have the reduced ability to remove the moisture.

Hereinafter, the description specifically describes a method of manufacturing the multilayer electronic component according to an exemplary embodiment of the present disclosure, and the present disclosure is not limited thereto. The description of the method of manufacturing the multilayer electronic component of this exemplary embodiment omits a description overlapping the description of the multilayer electronic component described above.

The multilayer electronic component according to an exemplary embodiment of the present disclosure may be manufactured as follows: first, slurry including powder such as barium titanate ($BaTiO_3$) may be coated and then dried on a carrier film to prepare a plurality of ceramic green sheets, thereby forming the dielectric layer.

The ceramic green sheet may be manufactured by mixing the ceramic powder, the binder and the solvent with one another to prepare the slurry and manufacturing the slurry in a shape of a sheet having a thickness of several micrometers by using a doctor blade method or the like.

Next, an internal electrode pattern may be formed by applying the conductive paste for an internal electrode, including the conductive metal, on the ceramic green sheet by using a screen printing method or a gravure printing method.

Next, the body may be prepared by stacking a plurality of layers of ceramic green sheets on each of which an internal electrode pattern is printed on each other, stacking a plurality of layers of ceramic green sheets on each of which the internal electrode pattern is not printed on each other on the upper and lower surfaces of a stack body, and then sintering the same. The margin portion may be formed by forming the internal electrode pattern on the ceramic green sheet except a portion where the margin portion is to be positioned.

Here, a sacrificial metal particle may be added to a margin region of the ceramic green sheet, on which the internal electrode pattern is not printed, and the ceramic green sheets on each of which the internal electrode is not printed may then be stacked on each other on the upper and lower surfaces of the stack body, thereby adding the plurality of metal particles to the portion where the margin portion is to be positioned. Next, the stack body may be sintered, thereby forming the margin portion including the protection region, in which the plurality of metal particles are disposed, in at least one of upper and lower portions thereof, based on a stack direction of the internal electrodes.

The sintering of the stack body may be performed under a condition in which the plurality of metal particles are not oxidized, and may be performed under a reducing atmosphere in which nitrogen ($N_2$) gas and hydrogen ($H_2$) gas are mixed with each other.

Alternatively, the margin portion may be formed by stacking the plurality of ceramic green sheets, cutting the internal electrode to be exposed through a side surface of the body, and then stacking the ceramic green sheets on the side surface.

Here, the plurality of metal particles may be added to at least one of the upper and lower portions of the ceramic green sheets stacked on the above side surface, based on the stack direction of the internal electrodes. Next, the stack body may be sintered, thereby forming the margin portion including the protection region, in which the plurality of metal particles are disposed, in at least one of upper and lower portions thereof, based on the stack direction of the internal electrodes.

Next, the external electrode connected to the internal electrode may be formed by applying a conductive paste for an external electrode on both surfaces of the body, opposing each other, drying and firing the same.

EXAMPLE

The ceramic green sheets on each of which the internal electrode pattern is formed may be stacked on each other by applying a certain temperature and pressure under a condition in which the capacitor may have a minimized deformation and the stack body is manufactured by attaching a ceramic green sheet forming the margin portion to its side surface.

When forming the margin portion, the protection region is formed by adding a nickel (Ni) metal particle having a different proportion to each sample in some regions of the ceramic green sheet attached to the side surface of the stack body.

The body 110 is formed by being calcined in a temperature of 400° C. or less and a nitrogen atmosphere, and then sintered at a sintering temperature of 1250° C. or less and a hydrogen concentration of $H_2$ of 1% or less, and the external electrodes 131 and 132 are formed on both sides of the body, opposing each other. In this manner, prepared are an example and a comparative example.

Next, each portion of the external electrode disposed on the fifth and sixth surfaces of the body is polished to be removed, thereby exposing the cross sections of the four protection regions 112a, 112b, 113a and 113b, formed on the upper and lower portions of the margin portions 112 and 113, and the number of the metal particles disposed in the above cross section and the ratio of the diameter of the metal particles are measured through analysis by the SEM-EDS.

The number of the metal particles indicates the sum of the numbers of the metal particles respectively measured in the four protection regions 112a, 112b, 113a and 113b formed in the upper and lower portions of each of the margin portions 112 and 113 disposed on the side of the body, and the ratio of the number of the metal particles having the diameter of 1 µm or more indicates the number of the metal particles having the diameter of 1 µm or more and disposed in the cross sections of the four protection regions compared to a total number of the metal particles disposed in the cross sections of the four protection regions.

Measured are the number of the metal particles and the ratio of the number of particles having the diameter of 1 µm or more for each of 50 samples, and Table 1 below shows average values of the same. Here, evaluation of the moisture resistance reliability is made for a total of 400 samples in 1 to 2 Vr and a condition of 8585 (i.e., 85° C. and relative humidity of 85%). Here, good (o) indicates a case where no failure occurs in the moisture resistance reliability out of 400 samples, average (Δ) indicates a case where 10 failures or less occur, and no-good (X) indicates a case where more than 10 failures occur.

TABLE 1

| | Number of metal particles disposed in a cross section | Ratio (%) of number of particles having diameter of 1 µm or more | Moisture resistance reliability (Failure frequency) | Evaluation |
|---|---|---|---|---|
| 1* | Less than 20 | 50 | 15/400 | X |
| 2* | 20 | 55 or more | 20/400 | X |
| 3 | 30 | 45 | 0/400 | ○ |
| 4 | 40 | 40 | 0/400 | ○ |
| 5 | 50 | 35 | 0/400 | ○ |
| 6 | 60 or more | 30 or less | 0/400 | ○ |
| 7* | 60 or more | 55 or more | 10/400 | Δ |
| 8* | 60 | 50 | 10/400 | Δ |

*indicates the comparative example.

Referring to Table 1, Comparative Examples 1* and 2* are cases where less than 30 is a range of the number of the metal particles disposed in the above cross section, and many frequent failures thus occur in the moisture resistance reliability, and it may thus be seen that a problem occurs in the reliability of the capacitor.

In addition, Comparative Examples 7* and 8* are cases where 30 or more is a range of the number of the metal particles disposed in the above cross section, less failures thus occur in the moisture resistance reliability compared to those of Comparative Examples 1* and 2*, but more than 45% is a range of the ratio of the number of the particles having the diameter of 1 µm or more, and it may thus be seen that the problem occurs in the reliability of the capacitor.

On the other hand, Examples 3 to 6 are cases each satisfying a numerical range of the present disclosure, and it may thus be seen that the multilayer electronic component having excellent moisture resistance reliability may be implemented.

As set forth above, the present disclosure may provide the multilayer electronic component securing the higher reliability and the moisture resistance reliability by including the outermost internal electrode prevented from the external moisture infiltration through the margin portion.

The present disclosure may provide the multilayer electronic component having the improved mechanical strength.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers and a plurality of internal electrodes stacked on each other in a first direction, while having the dielectric layer interposed therebetween;
margin portions disposed on opposite surfaces of the body in a second direction perpendicular to the first direction; and
external electrodes disposed on opposite surfaces of the body in a third direction perpendicular to the first and second directions, and respectively connected to the internal electrodes,
wherein each of the margin portions includes a protection region, in which a plurality of metal particles are disposed, in at least one of upper or lower portions thereof in the first direction such that respective protection regions in the at least one of upper or lower portions of the margin portions are spaced apart from each other in the second direction.

2. The multilayer electronic component of claim 1, wherein the protection region is disposed at a level between an upper surface of the margin portion and the internal electrode disposed at an uppermost of the internal electrodes, and a level between a lower surface of the margin portion and the internal electrode disposed at a lowermost of the internal electrodes.

3. The multilayer electronic component of claim 1, wherein the protection region is entirely disposed on the margin portion in the second direction.

4. The multilayer electronic component of claim 1, wherein the protection region is entirely disposed on the margin portion in the third direction.

5. The multilayer electronic component of claim 1, wherein at least one of the metal particles includes a metal having a higher ionization tendency than hydrogen.

6. The multilayer electronic component of claim 5, wherein the metal particle includes at least one of nickel (Ni), cobalt (Co), tin (Sn), zinc (Zn), magnesium (Mg), manganese (Mn), and alloys thereof.

7. The multilayer electronic component of claim 1, wherein 0.05 to 2 μm is a range of a diameter of the metal particles.

8. The multilayer electronic component of claim 1, wherein 30 or more metal particles are disposed in a cross section of the multilayer electronic component in a direction perpendicular to the third direction.

9. The multilayer electronic component of claim 1, wherein 45% or less is a range of a ratio of a number of the metal particles each having a diameter of 1 μm or more among the metal particles disposed in a cross section of the multilayer electronic component in the direction perpendicular to the third direction.

10. The multilayer electronic component of claim 1, wherein 2 to 30 μm is a range of a length of the protection region in the first direction.

11. The multilayer electronic component of claim 1, wherein 2 to 30 μm is a range of a length of the protection region in the second direction.

12. The multilayer electronic component of claim 2, wherein at least one of the metal particles includes a metal having a higher ionization tendency than hydrogen.

13. The multilayer electronic component of claim 12, wherein the metal particle includes at least one of nickel (Ni), cobalt (Co), tin (Sn), zinc (Zn), magnesium (Mg), manganese (Mn), and alloys thereof.

14. The multilayer electronic component of claim 2, wherein 2 to 30 μm is a range of a length of the protection region in the first direction.

15. A multilayer electronic component comprising:
a body including a plurality of internal electrodes stacked on each other in a first direction and a dielectric layer interposed therebetween;
margin portions disposed on opposite surfaces of the body in a second direction perpendicular to the first direction, wherein at least one of the margin portions includes a protection region including metal particles in at least one of upper and lower portions of the at least one of the margin portions in the first direction, and the metal particles include metal particles having a flake shape; and
external electrodes disposed on opposite surfaces of the body in a third direction perpendicular to the first and second directions, and respectively connected to the internal electrodes.

16. The multilayer electronic component of claim 15, wherein the internal electrodes do not overlap the protection region in a first direction.

17. The multilayer electronic component of claim 15, wherein a ratio of a number of the metal particles each having a diameter of 1 μm or more among the metal particles disposed in a cross section of the multilayer electronic component in the direction perpendicular to the third direction is 45% or less.

18. The multilayer electronic component of claim 15, wherein at least one of the metal particles includes a metal having a higher ionization tendency than hydrogen.

19. The multilayer electronic component of claim 18, wherein at least one of the metal particles includes at least one of nickel (Ni), cobalt (Co), tin (Sn), zinc (Zn), magnesium (Mg), manganese (Mn), and alloys thereof.

20. The multilayer electronic component of claim 18, wherein at least one of the metal particles includes nickel (Ni).

* * * * *